United States Patent
Elsässer et al.

(10) Patent No.: US 8,683,986 B2
(45) Date of Patent: Apr. 1, 2014

(54) METHOD FOR DIAGNOSING ADDITIONAL VALVES

(75) Inventors: Alfred Elsässer, Keltern (DE); Marco Warth, Fellbach-Öffingen (DE)

(73) Assignee: Mahle International GmbH (DE)

( * ) Notice: Subject to any disclaimer, the term of this patent is extended or adjusted under 35 U.S.C. 154(b) by 731 days.

(21) Appl. No.: 12/809,351

(22) PCT Filed: Dec. 5, 2008

(86) PCT No.: PCT/EP2008/066849
§ 371 (c)(1),
(2), (4) Date: Sep. 20, 2010

(87) PCT Pub. No.: WO2009/080466
PCT Pub. Date: Jul. 2, 2009

(65) Prior Publication Data
US 2011/0000187 A1 Jan. 6, 2011

(30) Foreign Application Priority Data
Dec. 21, 2007 (DE) .......................... 10 2007 062 097

(51) Int. Cl.
*F02B 47/08* (2006.01)
*F02B 47/10* (2006.01)

(52) U.S. Cl.
USPC .................................................. 123/568.16

(58) Field of Classification Search
USPC ........ 123/568.16, 698, 568.11; 701/108, 114; 73/114.74, 114.77
See application file for complete search history.

(56) References Cited

U.S. PATENT DOCUMENTS

| 5,152,273 | A | 10/1992 | Ohuchi |
| 5,257,610 | A | 11/1993 | Ohuchi |
| 5,488,938 | A | 2/1996 | Ohuchi |
| 5,675,080 | A | 10/1997 | Wada |
| 7,096,861 | B1 * | 8/2006 | Tsuda et al. ................... 123/688 |
| 2001/0035172 | A1 * | 11/2001 | Osaki et al. ............... 123/568.16 |
| 2003/0106368 | A1 * | 6/2003 | Osaki et al. ................... 73/118.2 |
| 2005/0199050 | A1 | 9/2005 | Matsumoto |

(Continued)

FOREIGN PATENT DOCUMENTS

| DE | 4135190 A1 | 5/1992 |
| DE | 4219339 A1 | 1/1993 |

(Continued)

OTHER PUBLICATIONS

English abstract provided for DE-102005006363.

(Continued)

*Primary Examiner* — Mahmoud Gimie
(74) *Attorney, Agent, or Firm* — Rader, Fishman & Grauer PLLC

(57) ABSTRACT

A method for adjusting an exhaust gas recycling rate in an internal combustion engine exhaust gas recycling system, comprising: arranging the exhaust gas recycling system in at least one of a fresh gas line, an exhaust gas line, and an exhaust gas recycling line of the internal combustion engine; actuating at least one additional valve; adjusting the at least one additional valve temporarily by changing the operation of the internal combustion engine based on an exhaust gas rate associated with a current operating point of the internal combustion engine; diagnosing the at least one additional valve; and evaluating the change of at least one engine operating parameter dependent on the exhaust gas recycling rate.

20 Claims, 1 Drawing Sheet

(56) References Cited

U.S. PATENT DOCUMENTS

| | | | |
|---|---|---|---|
| 2006/0207579 A1* | 9/2006 | Tsuda et al. | 123/568.16 |
| 2007/0062499 A1* | 3/2007 | Miyasako et al. | 123/568.16 |
| 2007/0119432 A1 | 5/2007 | Wang et al. | |

FOREIGN PATENT DOCUMENTS

| | | | |
|---|---|---|---|
| DE | 1952703 | A1 | 2/1996 |
| DE | 102005006362 | A1 | 8/2006 |
| DE | 102005006363 | A1 | 8/2006 |
| DE | 102006056367 | A1 | 6/2007 |
| EP | 1541841 | A1 | 6/2005 |
| EP | 1630402 | A1 | 3/2006 |

OTHER PUBLICATIONS

English abstract provided for DE-102005006362.

* cited by examiner

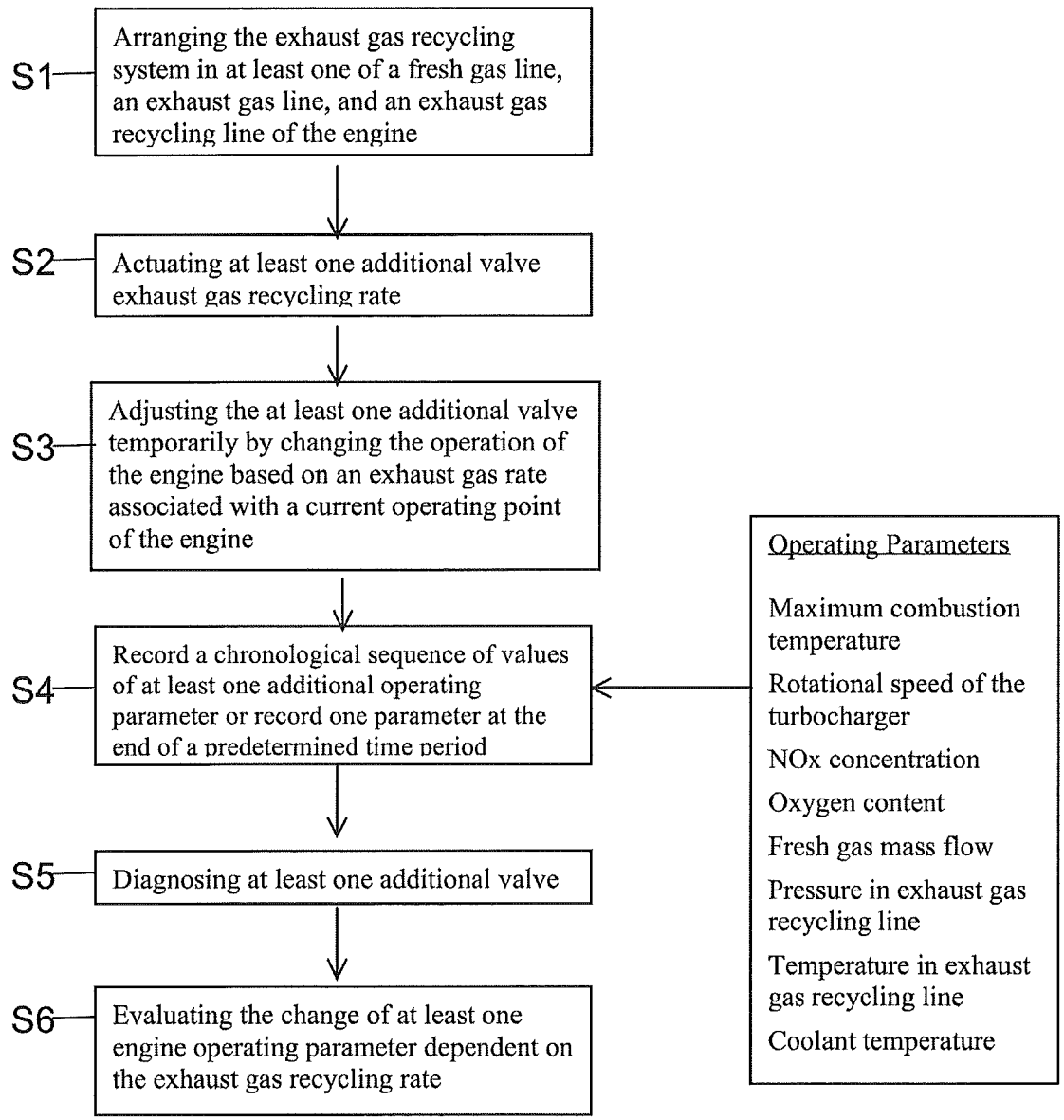

METHOD FOR DIAGNOSING ADDITIONAL VALVES

CROSS-REFERENCES TO RELATED APPLICATIONS

This application claims priority to German patent applications DE 10 2007 062 097.9 filed on Dec. 21, 2007, and PCT EP/2008/066849 filed on Dec. 5, 2008, both of which are hereby incorporated by reference in their entirety.

BACKGROUND

The present invention relates to a method for diagnosing at least one additional valve which, for adjusting an exhaust gas recycling rate in an exhaust gas recycling device of an internal combustion engine, is arranged in a fresh gas tract or in an exhaust gas tract or in an exhaust gas recycling line of the internal combustion engine.

SUMMARY

An internal combustion engine which is equipped with an exhaust gas recycling device for reducing nitrogen oxide emissions can have at least one additional valve for adjusting the exhaust gas recycling rate which depends on the operating point of the internal combustion engine. Such an additional valve is provided in addition to the gas exchange valves. It can be arranged upstream or downstream of an inlet point for recycled exhaust gas in a fresh gas line. In an exhaust gas line, it can suitably be arranged downstream of a removal point for exhaust gas to be recycled. In an exhaust gas recycling line, it can be arranged between the removal point on the exhaust gas side and the inlet point of the fresh gas side. In particular on the fresh gas side, a plurality of such additional valves can be arranged. For example, upstream of a fresh gas distributor from which individual fresh gas pipes supply fresh gas to the cylinders of the internal combustion engine, the fresh gas line can have at least two parallel fresh gas paths, wherein each of the at least two fresh gas paths can be controlled with one such additional valve, respectively. It is principally also possible to arrange such an additional valve downstream of the fresh gas distributor in each of the fresh gas pipes running to one of the cylinders.

At least in instances when the additional valve is arranged in the fresh gas line, such an additional valve is not a throttle which is provided in a conventional throttled intake system or fresh gas system to throttle the fresh gas supply to the internal combustion engine dependent on the operating point. The additional valve arranged in the fresh gas system is arranged in addition to the throttle and in particular downstream thereof. In an unthrottled fresh gas system, such a throttle is eliminated.

Preferably, the additional valves considered here involve fast-operating valves which are adjustable in a single-digit millisecond range between a closed position and an open position. In particular, such fast-operating additional valves operate as fast as or even faster than the gas exchange valves. Fast-operating valves of this type can principally also be used for impulse charging of the internal combustion engine. However, the focus here is on the use of such additional valves for adjusting the exhaust gas recycling rate in an exhaust gas recycling device. For this, said additional valves can be operated in such a manner that by means of sequentially opening and closing with a predefined frequency, the valves can specifically use and/or enhance pressure fluctuations, which occur in the fresh gas or the exhaust gas anyway due to the gas exchange processes, to specifically influence the pressure difference between the removal point on the exhaust gas side and the fresh gas inlet point on the fresh gas side. By increasing the pressure difference, the exhaust gas recycling rate can be increased whereas lowering said pressure difference reduces the exhaust gas recycling rate. The respective additional valve thus can be controlled for generating and/or enhancing pressure oscillations in the fresh gas tract and/or the exhaust gas tract so as to adjust the exhaust gas recycling rate.

With the fast-switching additional valves, it is in particular possible to adjust the exhaust gas recycling rate in a cylinder-selective manner, that is, to each individual cylinder of the internal combustion engine, an individual exhaust gas recycling rate can be allocated. This can be of advantage, for example, to compensate for design-related irregularities in the flow path to the respective cylinder.

For example, the additional valves can be designed as discontinuously operating valves. This means that during operation, the respective additional valve can be switched between a closed position and an open position, wherein the respective valve member rests temporarily between two switching operations in the respective switching position. In particular, the two switching positions can be end positions so that, moreover, between two switching operations, the moving direction of the valve member is reversed. Alternatively, the respective additional valve can also be designed as a continuously operating valve. This means that a valve member is permanently in motion thereby cyclically undergoing different switching states. For example, an opening time window and a closing time window can be provided, between which one transition time window, respectively, is arranged. The total of four time windows then forms a cycle which is permanently repeating. By means of the moving speed of the valve member, the time windows can be changed. The valve members of such additional valves can be, for example, flap valves, in particular butterfly flap valves, or rotary slide valves, or the like.

Since exhaust gas recycling in modern internal combustion engines contribute significantly to emission reduction, due to stricter environmental laws, it is desired to be able to check the proper function of the exhaust gas recycling device permanently or in predefined time intervals even during operation of the internal combustion engine or the motor vehicle equipped therewith. This function check or diagnosis has to be implemented with system-specific means, so-called "on-board-diagnosis", or OBD for short. This means for the exhaust gas recycling device operating with the at least one additional valve that the proper function of the at least one additional valve is also to be checked by means of OBD.

BRIEF DESCRIPTION OF THE DRAWINGS

The FIGURE illustrates an exemplary method.

DETAILED DESCRIPTION

The present invention is concerned with the problem to provide a method for diagnosing at least one such additional valve or to provide an improved embodiment for this purpose which is in particular characterized by an inexpensive implementation.

According to the invention, this problem is solved by the present method for adjusting an exhaust gas recycling rate in an internal combustion engine exhaust gas recycling system, comprising: arranging the exhaust gas recycling system in at least one of a fresh gas line, an exhaust gas line, and an exhaust gas recycling line of the internal combustion engine; actuating at least one additional valve; adjusting the at least one additional valve temporarily by changing the operation of the internal combustion engine based on an exhaust gas rate associated with a current operating point of the internal combustion engine; diagnosing the at least one additional valve; and evaluating the change of at least one engine operating parameter dependent on the exhaust gas recycling rate.

The invention is based on the general idea to temporarily control the respective additional valve in a different manner as this is normally provided for the current operating state of the internal combustion engine to adjust the desired exhaust gas recycling rate, or EGR rate for short. At the same time, at least the relevant change of the internal combustion engine's at least one operating parameter which correlates to the EGR rate or depends thereon is monitored. In other words, the control system which assigns EGR rates to certain operating states of the internal combustion engine and which actuates the respective additional valve in a certain manner for adjusting the EGR rate is temporarily detuned to observe the reaction of the system or the effect on the adjusted EGR rate. In case of a proper function of the respective additional valve, a measurable change of the EGR rate will occur. In case of a faulty function of the respective EGR systems, in particular, a change of the EGR rate can fail to appear. The reaction of the system in the form of a change of the EGR rate thus can be used for evaluating the functional capability, hence for diagnosing the respective additional valve.

The invention proposes in particular to temporarily change an EGR rate during the operation of the internal combustion engine, wherein the EGR rate is associated to a current operating point of the internal combustion engine and is adjusted with at least one additional valve, and wherein the change is carried out by means of a corresponding actuation of the at least one additional valve, the functionality of which is to be diagnosed. For diagnosing the respective additional valve, the change of at least one of the internal combustion engine's operating parameters dependent on the EGR rate is evaluated.

For this, according to a simple embodiment, the change of the at least one operating parameter can be determined in that the value of the operating parameter is recorded at the end of a predetermined time period. For diagnosing the respective additional valve, the measured end value of the operating parameter can now be compared with a reference value expected for the changed exhaust gas recycling rate. This comparison can be carried, for example, by means of a subtraction.

Alternatively, in a more complex embodiment, the change of the respective operating parameter can be determined in that the chronological sequence of the value of the respective operating parameter is recorded. For diagnosing the respective additional valve, the recorded chronological sequence of the value can now be evaluated.

To change the actuation of the additional valve for this diagnosis, this can principally be approached in different ways. In a typical construction, the additional valve is operated for the normal operation of the exhaust gas recycling device by means of engine maps in which control signals for the respective additional valve dependent on the EGR rate to be adjusted and for many different operating states or operating points of the internal combustion engine are stored. For the diagnosis, a changed operating point or operating state of the internal combustion engine on the inlet side, which differs from the actual operating point/operating state, can be specified for the control provided for the actuation of the respective additional valve. If the control accesses the associated engine maps with this "wrong" operating point/operating state, this results automatically in a different EGR rate with different control signals for the respective additional valve. Also, it is principally possible to change the value for the EGR rate temporarily, whereby the control signals dependent thereon are changed as well. It is also possible to change the control signals for the actuation of the additional valve directly.

For evaluating the chronological sequence of the at least one operating parameter, it is advantageous to measure the chronological sequence and, if necessary, to store it in a suitable storage. For diagnosing the at least one additional valve, it can be provided according to an advantageous embodiment to compare the measured chronological sequence of the at least one operating parameter with a chronological sequence expected for the changed EGR rate. In other words, to perform the diagnosis, the EGR rate or the control state of the respective additional valve is not varied arbitrarily for the respective operating point of the internal combustion engine, but is varied specifically so that a certain different EGR rate can be adjusted. The initiated changes in the chronological sequence of the operating parameters dependent on the EGR rate can be calculated in advance or can be determined through bench test trials or field trials. If the measured reaction of the system, thus the measured chronological sequence of the respective operating parameter corresponds with the expected system reaction, hence corresponds substantially with the expected chronological sequence, it can be assumed that the respective additional valve functions properly. If, however, a significant deviation between the measured sequence and the expected sequence occurs, a malfunction can be diagnosed.

The same applies in a simplified form for the case that from the respective operating parameter only the value available at the end of a predefined time period is determined and compared with the expected reference value which, e.g., can be determined in advance through bench test trials or the like.

Particularly suitable is an embodiment in which for evaluating those operating parameters are used which are already used by an engine control of the internal combustion engine in the normal operation for at least one other purpose. In other words, the diagnosis of the respective additional valve can be carried out based on operating parameters which are available in the engine control anyway. For example, hereby, additional sensor technology can be eliminated which reduces the operating expenses for implementing the proposed method for diagnosing significantly. Ideally, only a communicating connection between the control of the exhaust gas recycling system and the engine control has to be established. Since, with respect to the hardware, the control of the exhaust gas recycling system can be integrated in a control device which contains the engine control, the operating expense for producing a suitable data-transferring connection is low and can be implemented, for example, via suitable interfaces. Furthermore, since it is possible, with respect to the software, to implement the control of the exhaust gas recycling system in the engine control, the only thing necessary for coupling the controls is a software interface which reduces again the operating expenses for implementing the diagnosis method according to the invention.

Operating parameter which depend on the EGR rate and which are particularly suitable for evaluating the system reaction and thus for diagnosing the respective additional valve are explained hereinafter in more detail. Here, the invention uses the knowledge that the RGR rate has a significant influence on the maximum combustion temperature in the cylinders of the internal combustion engine. This combustion temperature significantly influences the exhaust gas temperature of the internal combustion engine. Furthermore, the nitrogen oxide formation during the combustion reaction depends disproportionately on the combustion temperature. A lowering of the combustion temperature thus can be used for a significant reduction of the nitrogen oxide emission. The recycled exhaust gases are cooled before they are fed into the fresh gas line. In an external exhaust gas recycling, an exhaust gas recycling cooler can be provided for this purpose. Responsible for the improved emission values through exhaust gas recycling is the influence of the recycled exhaust gas on the combustion temperature in the cylinders. This can be attributed in particular to the reduced oxygen content of the fresh gas exhaust gas mixture.

The typical rating of the EGR system takes place in such a manner that quasi in each operating point of the internal combustion engine, the EGR rate is selected such that a minimum for the nitrogen oxide emission is reached. Consequently, with such a design, each detuning of the functioning system results in an increase of the nitrogen oxides.

For the evaluation of the system reaction within the diagnosis of the respective additional valve, the following possibilities arise which are listed here purely exemplary and without limiting the generality. In particular, other operating parameters which are not mentioned here are not to be excluded.

For example, the temperature in the exhaust gas can be monitored as an operating parameter. A change of the EGR rate results in a change of the combustion temperature and thus in a change of the exhaust gas temperature. Temperature sensors can be available in the exhaust gas line anyway. In particular in a charged internal combustion engine which operates, for example, with an exhaust gas turbocharger, temperature sensors can be provided upstream and/or downstream of the turbine of the turbocharger.

Additionally or alternatively, the oxygen content in the exhaust gas can be used as operating parameter. The oxygen content is typically determined through the air number or through the fuel-air ratio. This lambda value can be measured in the exhaust gas, for example, by means of a lambda probe. Particularly suitable for this is a wideband lambda probe. With the changed EGR rate, the lambda value in the exhaust gas changes automatically. Such lambda probes are standard in the in exhaust gas systems of modern motor vehicles.

Additionally or alternatively, the rotational speed of the turbocharger can be used as operating parameter when the internal combustion engine is charged. A suitable rotational speed sensor can be available for a modern exhaust gas turbocharger anyway. Since the exhaust gas temperature, as explained, changes significantly dependent on the EGR rate, the enthalpy of the exhaust gas changes as well. The higher the exhaust gas temperature, the higher the exhaust gas enthalpy. However, an increased enthalpy results in an increased driving power at the turbine, whereby the rotational speed of the same and hence the rotational speed of the compressor and ultimately the rotational speed of the turbocharger increases. When extracting the exhaust gas to be recycled at the high pressure side of the turbocharger, so-called high pressure exhaust gas recycling, a change of the EGR rate results in a significant change of the mass flow conveyed to the turbine of the turbocharger. An increase of the EGR rate thus results in a reduction of the rotational speed of the turbine.

Additionally or alternatively, the $NO_x$ concentration in the exhaust gas can be used as operating parameter. $NO_x$ sensors which are suitable here can be available in modern exhaust gas systems, for example for $NO_x$ storage catalytic converters or for Denox catalytic converters, anyway. Since the combustion temperature has a significant influence on the $NO_x$ formation during the combustion reaction and since further, the EGR rate has a strong influence on the combustion temperature, even an insignificantly reduced EGR rate can cause an easily measurable increase of the $NO_x$ concentration in the exhaust gas.

Additionally or alternatively, the fresh gas mass flow in the fresh gas line can be used as operating parameter. Sensors which are suitable for this purpose such as, e.g., a hot-film air-mass meter, are installed in the fresh gas line anyway. Since the EGR rate directly influences the fresh gas demand of the internal combustion engine, a change of the EGR rate results in a corresponding change of the fresh gas mass flow supplied to the internal combustion engine.

Additionally or alternatively, the pressure in an exhaust gas recycling line can be used as an operating parameter. Said exhaust gas recycling line connects the removal point on the exhaust gas side with the inlet point on the fresh gas side. Here, a static pressure measurement can be performed. Such a pressure sensor can already be available in certain EGR systems. The adjustable EGR rate depends on the differential pressure between removal point and inlet point. Accordingly, there is a direct relation between the EGR rate and the pressure level within the EGR line. Additionally or alternatively, the temperature of the exhaust gas within the exhaust gas recycling line can also be used as an operating parameter. Here too, a static measurement is suitable because the temperature level in the exhaust gas conveyed through the EGR line changes with the EGR rate too. The higher the EGR rate, the higher the temperature since less heat can be dissipated through the EGR line.

Additionally or alternatively, the temperature of a coolant of the EGR cooler already mentioned above can also be used as an operating parameter. Here, a static temperature measurement is suitable. The higher the EGR rate, the more exhaust gas has to be cooled by means of the EGR cooler, and the higher is the heat to be dissipated by means of the coolant. Accordingly, the temperature of the coolant increases with the EGR rate.

The above mentioned operating parameters as well as other operating parameters dependent on the EGR rate can be evaluated individually or in any combination for the diagnosis of the respective additional valve.

The change of the EGR rate for the purpose of the diagnosis is carried out by a changed control of the respective additional valve. This actuation of the additional valve can vary in different ways with respect to the "normal" actuation during the normal operation of the EGR system. For example, the at least one additional valve for changing the EGR rate can be temporarily deactivated. In particular such additional valves which generate or enhance pressure oscillations for adjusting the respective EGR rate cause a significant decrease of the EGR rate in the deactivated state. It is obvious that, in the deactivated state, such an additional valve does not close the fresh gas tract or the exhaust gas tract. In particular, for this purpose, a valve member of the additional valve is preferably in a neutral position.

In particular for additional valves which are designed in a fast-operating manner to adjust the EGR rate by means of pressure fluctuations in the exhaust gas or in the fresh gas, it can be suitable to temporarily actuate the respective additional valve for opening and closing with a different opening time and, additionally or alternatively with a different closing time and, additionally or alternatively, with a different clock frequency. The generation and enhancement of pressure impulses within the fresh gas or the exhaust gas utilize resonance effects. Here, exact adherence to the clock frequency, the opening times or closing times is essential. A specific deviation from at least one of these parameters results in a noticeable change of the EGR rate.

Particularly advantageous is an embodiment of the method for diagnosing which is configured in such a manner that the method for diagnosing is carried out only during a stationary operating state of the internal combustion engine. For example, the diagnosis can be carried out during an idle operation, in particular when the vehicle is stationary, or during an overrun mode of the vehicle. During a stationary operating state, measurement and evaluation of the operating parameters for the diagnosis of the respective additional valve are simplified.

Advantageously, the method for diagnosing can also be carried out during an operating state which is uncritical with respect to pollutant emissions of the internal combustion engine. Such an uncritical operating state can occur, for example, during the overrun mode of the vehicle.

In another advantageous embodiment, the method for diagnosing can be carried out in such a manner that for changing the EGR rate, the at least one additional valve is temporarily controlled for a relatively short time period only. Conceivable is, for example, a time period of maximum 3,600° crankshaft angle, thus maximum 10 revolutions of the crankshaft. If the respective additional valve is designed as a fast-operating valve, shorter time periods are also conceivable. In particular in an embodiment in which the respective additional valve can adjust the EGR rate in a cylinder-selective manner, just one or two revolutions of the crankshaft can be sufficient to check the proper function of the additional valve. It is obvious that for this purpose, the relevant sensor system has to measure the respective operating parameter in a cylinder-selective manner too. For this, appropriate reaction times for the respective sensor must be provided.

If a plurality of additional valves are provided, for example, in each of a fresh gas pipe running from a fresh gas distributor to a cylinder, or in two or more parallel fresh gas paths arranged upstream of the fresh gas distributor, it can be provided to control each additional valve individually for temporarily changing the EGR rate, whereas the respective other additional valve or the respective other additional valves is actuated or are actuated, respectively, for adjusting the "correct" EGR rate associated with the current operating point. In this manner, a plurality of additional valves can be diagnosed one after the other, individually and independent from the other additional valves. Hereby it is possible, for example, to test the internal combustion engine in an emission-relevant operating point even when, for example, only five of six cylinders still operate optimally with respect to the emission values.

If to each cylinder of the internal combustion engine, a separate additional valve is allocated, the evaluation of the at least one operating parameter is carried out in a cylinder-selective manner. As mentioned, for this purpose, a suitably dynamic sensor system is required.

The invention claimed is:

1. A method for diagnosing a valve, comprising: adjusting an exhaust gas recycling rate in an exhaust gas recycling system of an internal combustion engine; arranging the exhaust gas recycling system in at least one of a fresh gas line, an exhaust gas line, and an exhaust gas recycling line of the internal combustion engine;
   correspondingly actuating at least one additional valve in a fresh gas line;
   changing the operation of the internal combustion engine based on an exhaust gas rate associated with a current operating point of the internal combustion engine by adjusting the at least one additional valve temporarily;
   diagnosing the at least one additional valve; and
   evaluating the change of at least one engine operating parameter dependent on the exhaust gas recycling rate.

2. The method according to claim 1, further comprising: determining the change of the at least one operating parameter; recording the value of the operating parameter at the end of a predefined time period; and comparing the measured end value of the at least one operating parameter with a reference value expected for the changed exhaust gas recycling rate for diagnosing the at least one additional valve.

3. The method according to claim 1, wherein a chronological sequence of the value of the operating parameter is recorded for determining change of the at least one operating parameter.

4. The method according to claim 3, wherein for diagnosing the at least one additional valve, the measured chronological sequence of the at least one operating parameter is compared with a chronological sequence expected for the changed exhaust gas recycling rate.

5. The method according to claim 1 wherein the at least one operating parameter used for evaluating is also used by an engine control of the internal combustion engine for at least one different purpose.

6. The method according to claim 1 wherein the at least one additional valve is temporarily deactivated for changing the exhaust gas recycling rate.

7. The method according to claim 1 wherein for opening and closing, the at least one additional valve is temporarily actuated with at least one of a different opening time, a different closing time and a different clock frequency.

8. The method according to claim 1 wherein the method for diagnosing is carried out during a stationary operating state of the internal combustion engine.

9. The method according to claim 1 wherein the method for diagnosing is carried out during an operating state which is uncritical with respect to the pollutant emission of the internal combustion engine.

10. The method according to claim 1 wherein the at least one additional valve is controlled only for a time period of maximum 3,600° crankshaft angle for changing the exhaust gas recycling rate.

11. The method according to claim 1 wherein in case of a plurality of additional valves, each one is controlled individually for changing the exhaust gas recycling rate, whereas at least one of the other additional valves is actuated adjusting the exhaust gas recycling rate associated with the current operating point.

12. The method according to claim 1, wherein to each cylinder of the internal combustion engine, a separate additional valve is allocated, wherein the evaluation of the at least one operating parameter is carried out in a cylinder-selective manner.

13. The method according to claim 1, wherein the at least one operating parameter used for evaluating is at least one of maximum combustion temperature, rotational speed of the turbocharger, NOx concentration, oxygen content, fresh gas mass flow, pressure in exhaust gas recycling line, temperature in exhaust gas recycling line or coolant temperature.

14. The method according to claim 2, wherein the at least one additional valve is temporarily deactivated for changing the exhaust gas recycling rate.

15. The method according to claim 2, wherein for opening and closing, the at least one additional valve is temporarily actuated with at least one of a different opening time, a different closing time and a different clock frequency.

16. The method according to claim 2, wherein the method for diagnosing is carried out during a stationary operating state of the internal combustion engine.

17. The method according to claim 2, wherein the method for diagnosing is carried out during an operating state which is uncritical with respect to the pollutant emission of the internal combustion engine.

18. The method according to claim 2, wherein the at least one additional valve is controlled only for a time period of maximum 3,600° crankshaft angle for changing the exhaust gas recycling rate.

19. The method according to claim 2, wherein in case of a plurality of additional valves, each one is controlled individually for changing the exhaust gas recycling rate, whereas at least one of the other additional valves is actuated adjusting the exhaust gas recycling rate associated with the current operating point.

20. A method for adjusting an exhaust gas recycling rate in an internal combustion engine exhaust gas recycling system, comprising:
   arranging the exhaust gas recycling system in at least one of a fresh gas line, an exhaust gas line, and an exhaust gas recycling line of the internal combustion engine;
   actuating at least one additional valve in a fresh gas line;
   adjusting the at least one additional valve temporarily by changing the operation of the internal combustion engine based on an exhaust gas rate associated with a current operating point of the internal combustion engine;
   diagnosing the at least one additional valve; and
   evaluating the change of at least one engine operating parameter dependent on the exhaust gas recycling rate.

* * * * *